Jan. 11, 1927.
G. A. BIGGS
1,613,816
RUNNER FOR TURBINES
Filed March 30, 1925   2 Sheets-Sheet 1
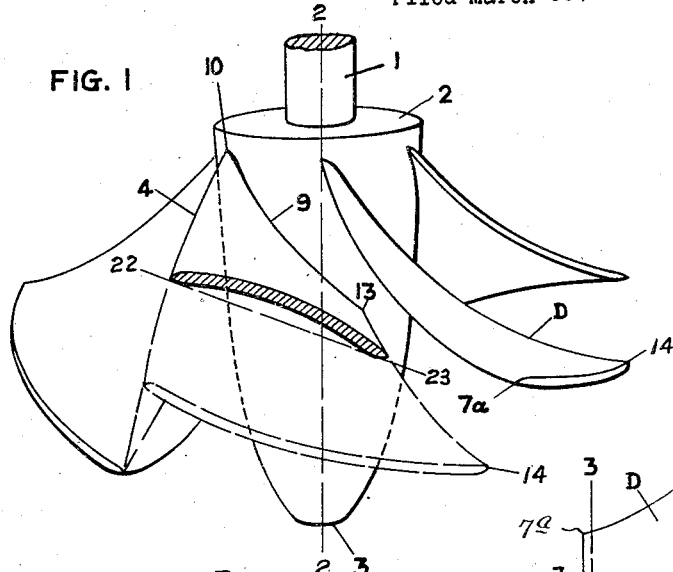
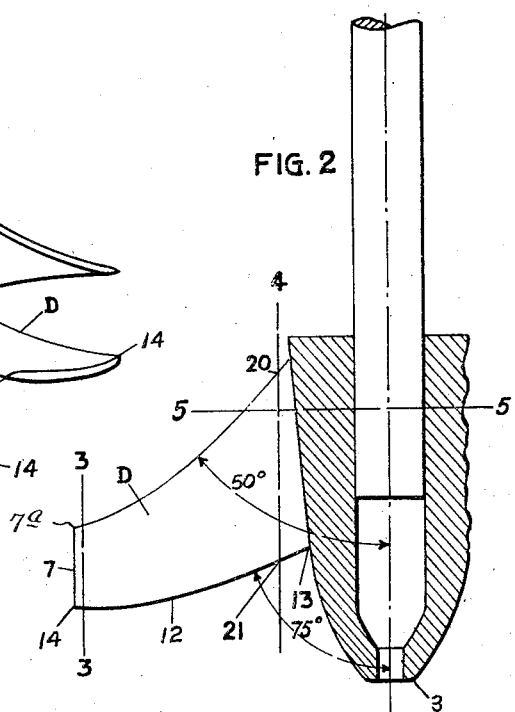
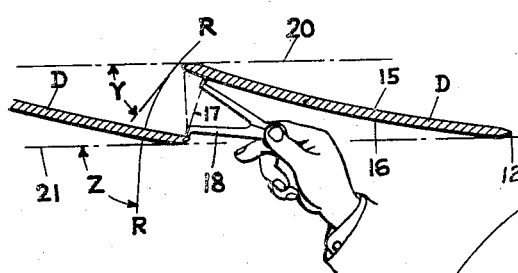
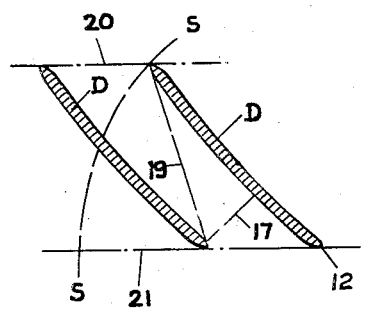
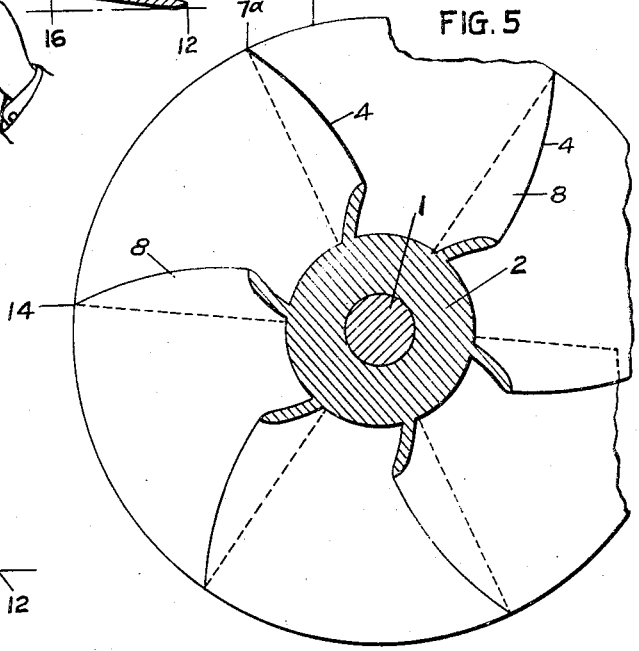
INVENTOR
GEORGE A. BIGGS
BY Toulmin & Toulmin,
ATTORNEYS Jan. 11, 1927.  1,613,816

G. A. BIGGS

RUNNER FOR TURBINES

Filed March 30, 1925   2 Sheets-Sheet 2

INVENTOR
GEORGE A. BIGGS
BY Toulmin & Toulmin
ATTORNEYS

Patented Jan. 11, 1927.

1,613,816

UNITED STATES PATENT OFFICE.

GEORGE A. BIGGS, OF SPRINGFIELD, OHIO, ASSIGNOR TO THE JAMES LEFFEL AND COMPANY, OF SPRINGFIELD, OHIO, A CORPORATION OF OHIO.

RUNNER FOR TURBINES.

Application filed March 30, 1925. Serial No. 19,300.

My invention relates to runners for turbines.

It is the object of my invention to provide a runner, particularly a high speed runner for turbines such as generally employed in connection with water, steam or gas.

My invention is also adaptable in connection with rotary pumps and centrifugal blowers.

It is an object of my invention to provide a turbine runner which will operate with high efficiency at high specific speed.

It is a further object of my invention to provide such a runner which will have the minimum of deviation of speed when operating under changes of load, and pressure, and at constant gateage.

It is my object to overcome the fluctuations characteristic of high speed runners heretofore known in the art which have been difficult to control as to uniformity of speed.

It is a further object of my invention to eliminate the use of high-specific speed runners now known in the art and which are generally designated as propeller types of runners, which are characterized as runners of axial or diagonal flow in which the smallest blade spacing measured in a flow surface is so increased in relation to the true length of the blade profile measured in the same flow surface that no cell is formed between the two adjacent blades, at least along a part of the blade surfaces.

It is an object of my invention to provide a runner the speed of which can be regulated by a governing means that need not have as fine or rapid a degree of adjustment of the turbine gates as now necessary in order to produce equally good or better results in regulation to meet similar changes of load and pressure, especially in other types of high specific speed runners.

It is a further object of my invention to provide a runner of high specific speed of great strength without distorting the shape of the passageways for the water in the runner by using large bucket thicknesses and thereby causing a reduction in efficiency and to substantially reduce the pitting and erosion on buckets. In my improved runner of the present invention I am able to secure a high speed coupled with great strength of the buckets using buckets of uniform thickness throughout.

It is a still further object of my invention to provide a high specific speed runner consisting of a central hub adapted to connect the turbine shaft with the buckets which buckets extend outwardly therefrom and are arranged to operate within a cylindrical or conical shaped chamber forming a part of the turbine.

It is a further object to provide buckets which overlap.

It is an additional object to provide such buckets progressively spaced closer to one another from the periphery to the hub.

It is a further object of my invention to provide buckets in which the overlapping portions are progressively greater from the periphery to the hub.

It is a further object of my invention to provide buckets which are so spaced that the water or other fluid will pass between the buckets with the minimum of friction.

It is a further object of my invention to provide buckets which project upwardly into the gate chamber to such an extent that the water meets the buckets in the gate chamber so that the water does not have to turn through a right angle, before it comes in contact with the buckets.

It is a further object of my invention to provide buckets which are so arranged that the convexity thereof provides great strength to resist the pressure if water in its downward flow and resist the bending stress thereon. The bucket blades are so arranged that the center areas are in tension as far away from and above the neutral axis as possible and the areas below that axis are in compression, such area being along the edges of the buckets and being in compression. It is also my object in such an arrangement to provide a bucket of substantially uniform thickness to eliminate the disadvantage heretofore common in buckets of greater thickness at predetermined points thereof to resist these stresses. In other words, my object by this construction is to secure the preferred result of strength without thickness and weight and the preferred result in providing a passageway for the water which will not be impeded by successive thicknesses of the runner bucket to compensate for the strain.

It is a further object of my invention to provide a runner bucket which may be made economically from flat plates of material which can be pressed or formed in the desired configuration, thus providing uniform parallel flow on both sides of the bucket which has not been heretofore used in a high speed runner so far as I know.

It is a further object of my invention to provide a bucket on a high speed runner in which the pitch or angle to the horizontal increases progressively from the periphery of the bucket to the hub and in which the pitch of the bucket at the leading edge is progressively greater than at the trailing edge.

It is a further object of my invention to provide buckets in which the angle of the leading edge to the horizontal plane is greater than the angle of the trailing edge to the plane.

It is a further object of my invention to increase progressively the angularity to a horizontal plane of the buckets from the periphery to the hub, at the same time progressively narrowing the space between the overlapping portions of the buckets from the periphery to the hub.

It is an additional object to provide such a bucket with the periphery end in a plane parallel to the axis of the hub.

It is a further object of my invention to provide such a bucket which proceeds inwardly and upwardly with the upper edge extending forwardly at a more marked angle than the lower edge when the bucket is viewed in a side elevation.

It is a further object of my invention to provide a detachable ring adjacent the periphery of the runner buckets in the runner chamber.

Referring to the drawings:

Figure 1 is a perspective of the runner with one bucket in section on the line 22—23;

Figure 2 is a section through the runner on the line 2—2 of Figure 1;

Figure 3 is a vertical section through the runner buckets on the line 3—3 of Figure 2;

Figure 4 is a section through the runner buckets on the line 4—4 of Figure 2;

Figure 5 is a section through the runner on the line 5—5 of Figure 2;

Figure 6:
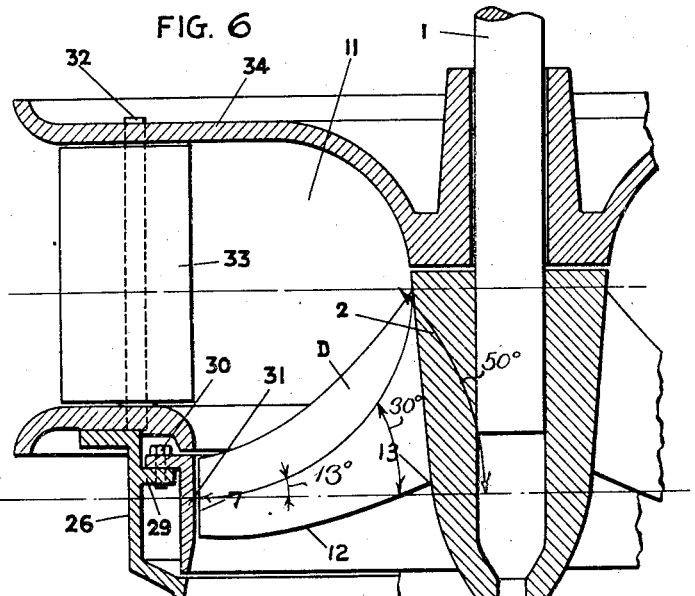
Figure 6 is a section through the runner, gate chamber and draft tube.
Figure 7:
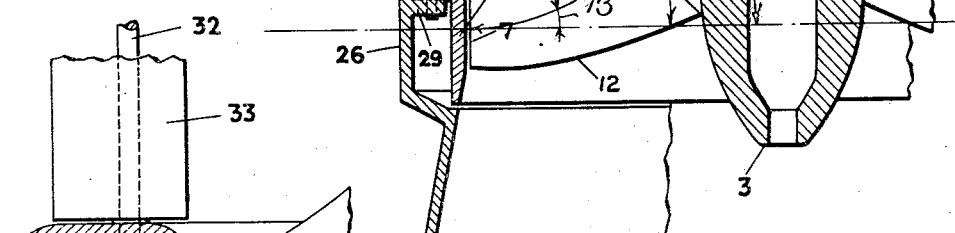
Figure 7 is a similar view without the detachable ring.

It will be understood that while the illustrations and descriptions apparently deal with a turbine in a vertical position, it will be understood that it is not desired to limit this invention to any particular position. It is adaptable to be positioned in various ways. Details of gate control mechanism and the like have been omitted for the purpose of clearness, it being understood that conventional mechanism of any preferred design may be utilized in connection with this runner. The same remarks apply to the nature of the draft tube.

Referring to the drawings in detail, 1 is a runner shaft provided with a hub 2 which tapers to a blunt point 3.

Mounted on this hub 2 about the periphery thereof at an angle of approximately 50 degrees with respect to the axis of the hub, are a plurality of runner buckets consisting of blades of substantially uniform thickness having the trailing and leading edge tapered to form sharp edges. It is preferred that the leading edge 4 of the bucket shall be curved or laid out on an arc which is subtended by a chord 5'—5', Fig. 8, which passes through the center 6 of the shaft 1 and through the point of juncture of the leading edge 4 with the peripheral edge 7 of the runner bucket at the point 7ª.

It will also be understood that the trailing edge of the bucket next preceding is straight and laid out on or corresponds to this chord, thus providing an overlapping bucket area, when viewed from above, designated 8. It is not essential, however, that the leading edge 4 be curved, but it is preferable. It is essential, however, to have an overlapping portion 8. The line on which the runner bucket joins the hub is designated for convenience as 9.

The leading edge 4 extends from a point 10 in the upper portion of the hub 2 within the gate chamber 11 downwardly either in a curved path or a straight path as may be desired to the point 7ª. This leading edge 4 in elevation in a vertical plane is approximately at an angle of 50 degress to the axis of the runner shaft, when measured at a point midway its length (Figure 2). The end of the runner bucket when viewed in elevation has its peripheral edge 7 in a vertical plane so that the end of the bucket may be equidistantly spaced from the wall of the ring of the runner chamber. The discharge or trailing edge 12 leaves the hub at the point 13 and proceeds downwardly and laterally as the trailing edge of the point 14 on the periphery, but its angularity to the major axis of the shaft is more than that of the leading edge, being approximately 75 degrees, when measured in a vertical plane. The 75° angle obtains at the approximate juncture of the hub with the bucket. The angle increases to approximately 90° at the periphery of the bucket. These angles are all taken relative to the vertical axis of the runner.

The space between the overlapping buckets is progressively greater from the hub to the periphery of the buckets.

The buckets proceed from an angle of pitch to a horizontal plane of 50 degrees at the hub to an angle of 30 degrees midway from the hub to the periphery and to an angle of approximately 13 to 14 degrees at the periphery with reference to a horizontal plane.

Figure 8:
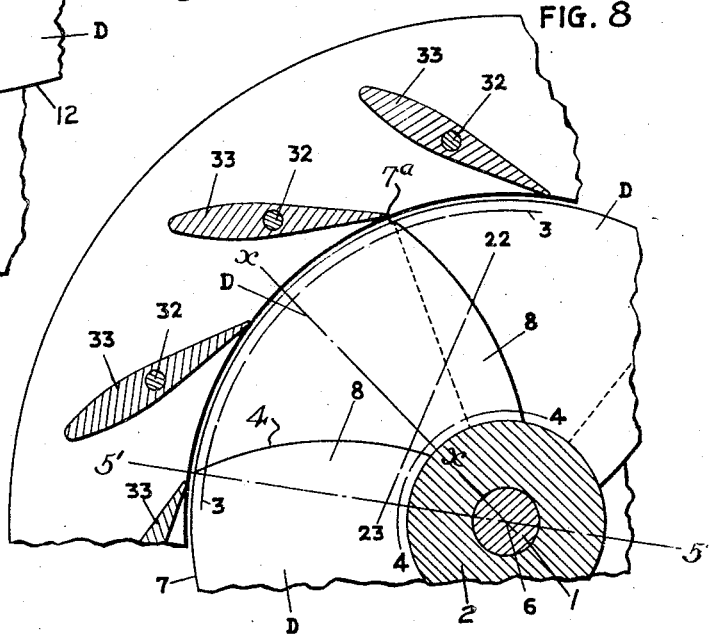
Figure 8 is a plan view with the hub, gates and shafts in section.

These angles are measured on the center line X—X of Figure 8 of the bucket which is a line extending down the center of the bucket from the hub to the periphery of the bucket. (See Figure 6.)

It will be noted that the bucket has an upper surface 15 substantially parallel with the lower surface 16. The edges are brought to a sharp line, but this does not disturb the principle of having a bucket of uniform thickness, thus providing a uniform space above and below the bucket for the passage of fluid.

As to the trailing edge, while I prefer a straight edge, it may be curved without departing from the essentials of my invention.

Referring to Figures 3 and 4 showing sections through the buckets as if the buckets were aligned so that these sections would be through the buckets at the same points, or in other words as if the buckets were cut by a plane so that the sections of the buckets would be laid out on a flat surface, it will be noted that the fluid acting on the buckets in its downward course describes a path of motion similar in form to the line RR. In order to insure a turbine without excessive speed fluctuations, I have provided buckets so arranged that the path RR of the propelling fluid in Figure 3, or SS in Figure 4 is at all times intercepted by the buckets. A cell between the buckets is so formed as to insure this result. The margins of this cell form a substantial trapezoidal space curved downwardly and outwardly which is progressively larger from the hub to the periphery of the buckets between the buckets, through which space or cell the fluid passes.

In order to prove the cell effect is provided between the buckets the distance 17 measured by a pair of calipers 18 with one leg of the calipers resting at any position on the inner discharge edge of the bucket between the hub and periphery will be less than the distance from the trailing edge to the leading edge measured on a straight line 19. By increasing the bucket length between the leading and trailing edge so that the path of motion of the fluid is at all times intercepted by the bucket surfaces thereby forming a cell effect at 17, the horizontal planes 20 and 21 in which the inlet edge and the discharge edge of the buckets travel are farther apart than in propeller types of turbines of similar speed, power, and number of buckets. By this construction the buckets moving between the planes 20 and 21 pass through a greater portion of the path of motion of the fluid, thereby providing a greater length of time relative to the speed of the runner during which the direction of the path of motion of the fluid can be changed from the angle Y to the angle Z. A more gradual change of direction of the fluid is thus provided which is conducive to greater efficiency. I have found by testing a turbine classified according to present customary turbine practice as of high specific speed constructed in a manner described in the foregoing and in accordance with usual methods of testing that when the load is changed more or less suddenly, gates remaining stationary, that the speed of the runner does not deviate exceedingly but the change is moderate, which is a desirable feature from a speed regulating point of view.

It will be observed, of course, that the periphery of the buckets lies in the semicircular path so that the peripheries of the buckets will be equally spaced from the surrounding structure.

In order to provide a runner of great strength without distorting the shape of the passageways for the fluid, I have provided buckets in which the upper and lower surfaces are parallel as at 15 and 16. In Figure 5 there will be seen a bucket cut along the hub by a straight plane 5—5 on Figure 2. By providing the buckets with parallel surfaces as described, the path of motion of the fluid along the upper surface of the bucket is parallel with the path of motion along the lower surfaces so that when one of the bucket surfaces is developed to correct shape, the other surface will also be provided with a correct shape by virtue of the two surfaces being parallel to one another. With other methods of construction such as generally employed with runners of the propeller type the bucket surfaces are not parallel. Therefore, when the shape of one surface of the bucket is correctly developed, then the surface on the opposite side will be incorrect because the surfaces are not parallel and consequently the path of motion of fluid on that side is incorrect and will be distorted leading to inefficiency in the machine.

When the contour of the bucket surface is cut by a plane 22—23 in Figure 8, the resulting cross section will be as shown in Figure 1 in which the upper surface is convex and the lower surface is concave. The fluid passing through the turbine produces a downward pressure on the buckets tending to bend them downwardly. By arranging the cross section as illustrated and described, a neutral axis in the plane 22—23 of Figure 8 will be such that the areas of the bucket material above this axis will be in tension and those below in compression. For each blade or bucket there is a neutral plane relative to the compression and tension stresses in the blade material, and any cross section of a blade will contain a neutral axis above which the fibrous stress is tension and below which it is compression. Greater strength is therefore provided where the areas of the material in compression are as far away as possible from those in tension and by this construction greater strength is provided than if the lower surfaces were parallel or convex in relation to the neutral axis 22 and 23.

It will be obserevd that the buckets are concave on the upper surface and convex on the lower surface and so arranged that on this plane 22—23 they are convex on the upper surface and concave on the lower surface.

It will be seen that when the section is taken on a plane at approximately 75 degrees to a radius line projected from the center of the hub, such as on the line 22—23, located as in Figure 8, the bucket will be concave on the under side and convex on the upper side. The curvature in transverse section flattens out as the edge 7 is approached. If the section is taken on a cylinder or on a curved line parallel to the curved periphery of the bucket, then the reverse will be true. That is, the underside of the bucket will appear convex and the upper side concave as in Figures 3 and 4. Such figures are taken on planes of cylindrical character concentric with and parrallel to the major axis of the runner which are designated as having been taken on the lines 3—3 and 4—4 of Figure 2.

Referring to Figure 6 the ring 31 forming the chamber in which the runner is located is so arranged that it can be removed from its operating position without displacing the surrounding structure that supports it. In Figure 6, the structure supporting the ring is provided with a suitable shoulder 29 upon which is detachably bolted the ring 31.

The angle between the leading edge of the bucket and the major axis of the ring is approximately 50 degrees in the runner shown and the angle of the trailing edge is approximately 70 degrees. The runner of my invention is one of high specific speed. By specific speed I mean the result obtained mathematically by the formula $$\frac{\sqrt{H.P.} \times R.P.M.}{H^{5/4}},$$

in which formula "$\sqrt{H.P.}$" is the square root of the horsepower developed by the turbine when operating at the speed of highest efficiency, "R. P. M." is the number of revolutions per minute the turbine makes when operating at highest efficiency, "H" is the head of water or equivalent pressure of fluid expressed in feet acting on the turbine to produce the H. P. and R. P. M. The number representing H being raised by mathematical process to the $\frac{5}{4}$ power of the number when used in the formula.

By "high specific speed" I mean a specific speed of 120 revolutions or more.

It will be understood that I desire to comprehend within my invention such modifications as may be necessary to adapt it to varying conditions of use.

Having thus fully described my invention, what I claim as new and desire to secure by Letters Patent, is:—

1. In a water wheel, a runner, a hub, and a plurality of buckets which are concave on the upper surface and convex on the lower surface when viewed on a section taken on a cylindrical plane parallel to the major axis of the runner and convex on the upper surface and concave on the lower surface when viewed in a section taken on a straight plane at an angle to the radius of the runner.

2. In a water wheel, a runner, a hub, and a plurality of buckets which are concave on the upper surface and convex on the lower surface when viewed on a section taken on a cylindrical plane parallel to the major axis of the runner and convex on the upper surface and concave on the lower surface when viewed in a section taken on a straight plane at an angle to the radius of the runner, said angle being about 75 degrees plus or minus.

3. In a water wheel, a runner, a hub, and a plurality of buckets, said buckets having a concave under surface and a convex upper surface when a section is taken on a straight plane and having the reverse structure when the structure is on a curved plane, said buckets being arranged to overlap one another.

4. In a water wheel, a runner, a hub, and a plurality of buckets, said buckets having a concave under surface and a convex upper surface when a section is taken on a straight plane and having the reverse structure when the structure is on a curved plane, said buckets being arranged to overlap one another, the overlapping being progressively greater from the periphery to the hub.

5. In a water wheel, a runner, a hub, and a plurality of buckets, said buckets having a concave under surface and a convex upper surface when a section is taken on a straight plane and having the reverse structure when the structure is on a curved plane, said buckets being arranged to overlap one another, the overlapping being progressively greater to the periphery from the hub, the point of intersection of successive bucket edges being such that the periphery of the trailing edge of one bucket is directly beneath the periphery of the leading edge of the other bucket.

6. In a water wheel, a runner, a plurality of overlapping buckets arranged at an angle to the major axis of the runner progressively greater from the periphery to the hub, the leading edge of each blade at a greater angle than the trailing edge, said angularity increasing from periphery to hub.

7. In a water wheel, a runner, a hub, a plurality of overlapping blades arranged at an increasing angle from the periphery to the hub, the greater angle being at the hub, said angles being measured with respect to the major axis of the runner.

8. In a water wheel, a runner, a hub, a plurality of overlapping blades arranged at an increasing angle from the periphery to the hub, the greater angle being at the hub, and the leading edges being arranged at a greater angle than the trailing edges, said angles being measured with respect to the major axis of the runner.

9. In a water wheel, a runner, a hub, a plurality of overlapping blades being arranged at an increasing angle from the periphery to the hub with respect to the major axis of the runner, the greater angle being at the hub, and the leading edges being arranged at a greater angle than the trailing edges, said blades being concave on the under surface and convex on the upper surface when viewed on a straight plane parallel to the major axis of the runner and located at an angle to the radius of the runner and concave on the upper surface and convex on the lower surface when viewed in section on a cylindrical plane parallel to the axis of the runner.

10. In a hydraulic turbine, a water wheel runner having a plurality of overlapping buckets, a gate chamber, the peripheral edges of said buckets being so arranged that when viewed in elevation they are in a vertical plane and extend downwardly and outwardly with the leading edges thereof extending into said gate chamber and so arranged that the leading edges are disposed at lesser angles to the vertical axis of the runner than the trailing edges, said buckets being concave on the under surface and convex on the upper surface on any section taken on a straight line parallel to the major axis of the runner and located at an angle to the radius of the runner, and concave on the upper surface and convex on the lower surface when viewed in section on the cylindrical plane parallel to the axis of the runner.

11. In a water wheel, a runner having a plurality of buckets, said buckets being of equidistant thickness throughout so that their upper and lower surfaces are substantially parallel, said buckets overlapping one another partially to form water cells between the overlapping portions, the overlapping of the buckets being progressively greater from the periphery to the hub.

12. In a water wheel, a runner having a plurality of buckets, said buckets being of equidistant thickness throughout so that their upper and lower surfaces are substantially parallel, said buckets overlapping one another partially to form water cells between the overlapping portions, the overlapping of the buckets being progressively greater from the periphery to the hub, and the distance between the overlapping portions being progressively less from the periphery to the hub when measured on a line vertical to the edge of the lower bucket.

13. In a high speed runner having a hub and a plurality of buckets, said buckets overlapping one another, the space between the overlapping buckets being such that it is progressively less from the periphery to the hub, when measured on a line vertical to the edge of the lower bucket, and to the extent of the overlapping being progressively greater from the periphery to the hub.

14. In a water wheel, a runner having a hub and a plurality of buckets, said buckets overlapping one another, the space between the overlapping buckets being such that it is progressively less from the periphery to the hub, when measured on a line vertical to the edge of the lower bucket, to the extent of the overlapping being progressively greater from the periphery to the hub, said shape of the opening between said buckets through which the fluid passes being substantially trapezoidal slightly curved about its major axis having the peripheral end larger than the hub end.

15. In a water wheel, a runner having a hub and a plurality of buckets, said buckets being pitched at an angle to a horizontal plane at right angles to the major axis of the runner and being progressively pitched from the periphery to the hub and progressively pitched from the trailing edge to the leading edge, said blades partially and continuously overlapping one another to form a water cell therebetween, whereby the water may pass therebetween having its angle of direction of motion gradually changed.

16. In a water wheel, a runner having a hub and a plurality of buckets, said buckets being pitched at an angle to a horizontal plane at right angles to the major axis of the runner and being progressively pitched from the periphery to the hub and progressively pitched from the trailing edge to the leading edge, said blades partially overlapping one another to form a water cell therebetween, whereby the water may pass therebetween having its angle of direction of motion gradually changed, said buckets being formed of material of equidistant thickness so that the upper and under surfaces of the bucket are substantially parallel when measured on a line vertical to the edge of the lower bucket.

17. In a water wheel, a runner having a hub and a plurality of blades, said blades being pitched at an angle to a horizontal plane at right angles to the major axis of the runner and being progressively pitched from the periphery to the hub and progressively pitched from the trailing edge to the leading edge, said blades partially overlapping one another to form a water cell between them, whereby the water may pass therebetween having its angle of direction of motion gradually changed, said buckets being concave on the under surface and convex on the upper surface when viewed on a straight line parallel to the major axis of the runner and located at an angle to the radius of the runner and concave on the upper surface and convex on the lower surface when viewed in section on a cylindrical plane parallel to the axis of the runner.

18. In a water wheel, a runner having a hub and a plurality of blades, said blades being pitched at an angle to a horizontal plane at right angles to the major axis of the runner and being progressively pitched from the periphery to the hub and progressively pitched from the trailing edge to the leading edge, said buckets partially overlapping one another to form a water cell therebetween, whereby the water may pass therebetween having its angle of direction of motion gradually change, said buckets being concave on the under side and convex on the upper surface when viewed on a straight line parallel to the major axis of the runner and concave on the upper surface and convex on the lower surface when viewed in section on a cylindrical plane parallel to the axis of the runner.

19. In a water wheel, a runner having a hub and a plurality of buckets, said buckets being characterized by the fact that when subjected to downward pressure of the fluid the fibers of the edges of the buckets will be in compression and those towards the center of the bucket will be under tension, said buckets having upper and lower surfaces parallel, the bucket being formed of material of substantially uniform thickness, said buckets being concave on the under surface and convex on the upper surface when viewed on a straight line parallel to the major axis of the runner and located at an angle to the radius of the runner and concave on the upper surface and convex on the lower surface when viewed in section on a cylindrical plane parallel to the axis of the runner.

20. In a water wheel, a runner having a hub and a plurality of buckets, said buckets being characterized by the fact that when subjected to downward pressure of the fluid the fibers of the edges of the buckets will be in compression and those towards the center of the bucket will be under tension, said buckets having upper and lower surfaces parallel, the bucket being formed of material of substantially uniform thickness, and also said buckets being concave on the under surface and convex on the upper surface when viewed on a straight line parallel to the major axis of the runner and located at an angle to the radius of the runner and concave on the upper surface when viewed in section on a cylindrical plane parallel to the axis of the runner, the buckets being progressively pitched from the periphery to the hub.

21. In a water wheel, a runner having a hub and a plurality of buckets, said buckets being characterized by the fact that when subjected to downward pressure of the fluid the fibers of the edges of the buckets will be in compression and those towards the center of the bucket will be under tension, said buckets having upper and lower surfaces parallel, the bucket being formed of material of substantially uniform thickness and also said buckets being concave on the under surface and convex on the upper surface when viewed on a straight line parallel to the major axis of the runner and located at an angle to the radius of the runner and concave on the upper surface and convex on the lower surface when viewed in section on a cylindrical plane parallel to the axis of the runner, the buckets being progressively pitched from the periphery to the hub with a greater degree of pitch at the leading edge than at the trailing edge.

22. In a water wheel, a runner, a hub, and a plurality of overlapping buckets pitched at an angle to a horizontal plane passing through the runner axis so arranged that the areas of the material of the edges of the buckets are under compression and the areas towards the center of the bucket are under tension and so arranged that the buckets have the upper surfaces concave and the lower surfaces convex with a water cell formed between the overlapping portions of the buckets.

23. In a water wheel, a runner, a hub, and a plurality of overlapping buckets pitched at an angle to a horizontal plane passing through the runner axis so arranged that the areas of the material of the edges of the buckets are under compression and the areas towards the center of the bucket are under tension and so arranged that the buckets have the upper surfaces concave and the lower surfaces convex with a water cell formed between the overlapping portions of the buckets, said overlapping portions being progressively greater towards the hub.

24. In a water wheel, a runner having overlapping buckets pitched at an angle to a horizontal plane through the major axis of the runner whereby cells are formed between the overlapping portions of the buckets in the space between the leading and trailing edges of successive buckets greater than the distance between said buckets on a line vertical to their general planes.

25. In a water wheel, a runner, a hub, and a plurality of buckets having the line of their juncture with the hub concave on the upper surface and convex on the lower surface, said buckets being disposed at an angle to a horizontal plane at right angles to the major axis of the runner, the buckets being spaced from one another on the lines on which they join the hub at a greater distance at the leading edges of the buckets than at the trailing edges.

26. In a water wheel, a runner, a hub, and a plurality of buckets having the line of their juncture with the hub concave on the upper surface and convex on the lower surface, said buckets being disposed at an angle to a horizontal plane at right angles to the major axis of the runner, the buckets being spaced from one another on the lines on which they join the hub at a greater distance at the leading edges of the buckets than at the trailing edges, said buckets being progressively pitched from periphery to hub.

27. In a water wheel, a runner, a hub, and a plurality of buckets having the line of their juncture with the hub concave on the upper surface and convex on the lower surface, said buckets being disposed at an angle to a horizontal plane at right angles to the major axis of the runner, the buckets being spaced from one another on the lines on which they join the hub at a greater distance at the leading edges of the buckets than at the trailing edges, said buckets being progressively pitched from periphery to hub, and overlapping to form water cells therebetween from periphery to hub.

28. In a water wheel, a runner, a hub, and a plurality of buckets having the line of their juncture with the hub concave on the upper surface and convex on the lower surface, said buckets being disposed at an angle to a horizontal plane at right angles to the major axis of the runner, the buckets being spaced from one another on the lines on which they join the hub at a greater distance at the leading edges of the buckets than at the trailing edges, said buckets being progressively pitched from periphery to hub, and overlapping to form water cells therebetween from periphery to hub, the pitch of the leading edge being greater progressively than the pitch of the trailing edge of the buckets.

29. In a water wheel, a runner, a hub, and a plurality of buckets having the line of their juncture with the hub concave on the upper surface and convex on the lower surface, said buckets being disposed at an angle to a horizontal plane at right angles to the major axis of the runner, the buckets being spaced from one another on the lines on which they join the hub at a greater distance at the leading edges of the buckets than at the trailing edges, said buckets being progressively pitched from periphery to hub, and overlapping to form water cells therebetween from periphery to hub, the pitch of the leading edge being greater progressively than the pitch of the trailing edge of the buckets, said leading edges being laid out on an arc which is sub-tended by the straight edge of the preceding trailing edge of the preceding bucket which is located on a radius of the runner.

30. In a water wheel, a runner, a hub, and a plurality of buckets having the line of their juncture with the hub concave on the upper surface and convex on the lower surface, said buckets being disposed at an angle to a horizontal plane at right angles to the major axis of the runner, the buckets being spaced from one another on the lines on which they join the hub at a greater distance at the leading edges of the buckets than at the trailing edges, said buckets being progressively pitched from periphery to hub, and overlapping to form water cells therebetween from periphery to hub, the pitch of the leading edge being greater progressively than the pitch of the trailing edge of the buckets, said leading edges being laid out on an arc which is sub-tended by the straight edge of the preceding trailing edge of the preceding bucket which is located on a radius of the runner, said buckets being so formed that when viewed in a section on a cylinder and parallel to the major axis of the runner, the under surface of the bucket will be convex and the upper surface concave, but when viewed on a section taken on a plane at an angle to a radius of the runner the reverse will be true.

In testimony whereof, I affix my signature.

GEORGE A. BIGGS.